Sept. 18, 1956  F. KOHLER  2,763,758
ARC SUPPRESSER FOR DIELECTRIC HEATING EQUIPMENT
Filed April 21, 1953
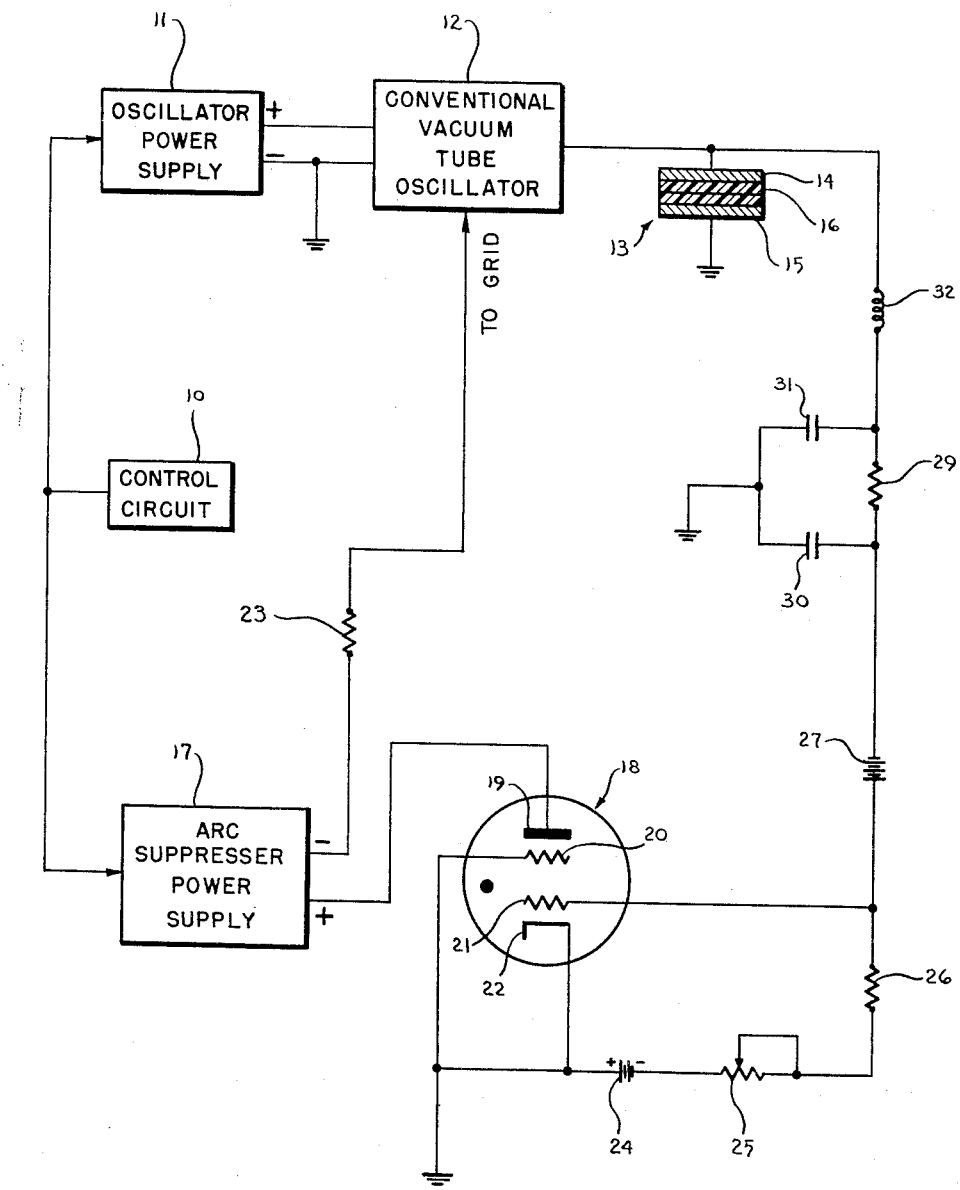
INVENTOR.
Fred Kohler.

United States Patent Office 2,763,758
Patented Sept. 18, 1956

2,763,758

ARC SUPPRESSER FOR DIELECTRIC HEATING EQUIPMENT

Fred Kohler, New York, N. Y.

Application April 21, 1953, Serial No. 350,114

5 Claims. (Cl. 219—10.77)

My invention relates to dielectric heating equipment, and more particularly to an arc suppresser for high power, radio frequency dielectric heating apparatus used to bond thermoplastic materials, such as vinyl.

Dielectric heating equipment for bonding thermoplastics is well known in the art. Two thin sheets (4 mils–20 mils) of thermoplastic material are sandwiched under pressure between first and second polished metallic electrodes to form a capacitance. A radio frequency (10 mc.–200 mc.), high power (0.1 kw.–5.0 kw.) oscillator supplies energy which is applied across this capacitance for a given period of time. Heat will be produced throughout the thermoplastic material due to the fact that it has a considerable power factor. This heat will be readily conducted away by the electrodes at the outer surfaces of the two sheets, but not at the interface theerof. Therefore, the temperature at the interface will rise to the melting point of the thermoplastic material allowing the fusing of the two sheets to take place.

Dielectric heating equipment is now being used to a great extent in the manufacture of shower curtains, inflatable toys, raincoats, etc., where mass production techniques are used.

From time to time, due to either a surge of energy or a defect such as a pinhole in the thermoplastic material, an arc is instituted between the electrodes, causing pitting thereof. The electrodes must then be repolished before they can be used again. It will be seen that this arcing acts as a bottle neck in the mass production techniques employed by the industries using dielectric heating equipment.

The prior art recognized that arcing caused more power to be drawn, which are accompanied by a rise in plate current of the oscillator. Therefore, an overload relay was inserted in the oscillator for turning it off whenever the plate current exceeded a given value. This did not prevent arcing, but merely minimized the damage done to the electrodes thereby.

My invention works on an altogether different principle. I have found that just prior to the institution of an arc, from whatever cause, there is a drop in the direct current resistance of the thermoplastic from several thousand megohms to a few megohms or even less.

It is, therefore, an object of my invention to provide a device which is responsive to the direct current resistance of the thermoplastic material being heated, and which renders the oscillator supplying the radio-frequency energy non-operating whenever the direct current resistance of the thermoplastic material becomes lower than a given value.

It is a further object of my invention to provide a circuit which entirely suppresses arcing in the bonding of thermoplastic materials by dielectric heating.

These and other objects of my invention will be better understood from the following description taken together with the accompanying drawing, which consists of a single figure showing a preferred embodiment of my invention.

Referring now to the figure, control circuit 10, which includes a timer and means for instituting a timing period, is connected to both oscillator power supply 11 and arc suppresser power supply 17. Oscillator power supply 11 has its negative terminal grounded. Conventional oscillator 12, which may be a Hartley, Colpitts or a tuned-plate tuned-grid oscillator, etc., is energized by oscillator power supply 11 in the usual manner. The output of oscillator 12 is applied to load capacitance 13, as shown. Load capacitance 13 is composed of electrode 14, which is connected to oscillator 12, electrode 15, which is grounded, and the thermoplastic material to be bonded, which is interposed between electrodes 14 and 15. Control circuit 10, oscillator power supply 11, oscillator 12, and load capacitance 13 make up a conventional dielectric heater.

Arc suppresser power supply 17 has its positive terminal connected directly to anode 19 of thyratron 18. Cathode 22 and screen grid 20 of thyratron 18 are both grounded. The negative terminal of arc suppresser power supply 17 is connected to the grid of oscillator 12 through current limiting resistor 23.

Battery 24 has its positive terminal connected to ground and its negative terminal connected to one side of adjustable resistor 25. The other side of adjustable resistor 25 is connected to control electrode 21 of thyratron 18 through resistor 26. Battery 27 has its positive terminal connected to control electrode 21. The negative terminal of battery 27 is connected to the input of filter 28, made up of resistor 29 and capacitors 30 and 31, as shown. The output of filter 28 is applied to electrode 14 through radio frequency choke 32.

In operation, oscillator power supply 11 is energized only during the timing period of control circuit 10. Thus, neglecting my arc suppressing circuit, radio-frequency power from oscillator 12 will be supplied to load capacitance 13 during the entire extent of a timing period, in a manner well known in the art.

Arc suppresser power supply 17 is also energized only during the timing period of control circuit 10. However, the potential on control electrode 21, is normally maintained at a potential sufficient to prevent the firing of thyratron 18, so that thyratron 18 acts as a normally open switch isolating arc suppresser power supply 17 from oscillator power supply 11.

Battery 24, resistances 25 and 26, battery 27, resistance 29, choke 32, and load capacitance 13 form a complete circuit, so that a direct current, determined by the total resistance of this circuit and the voltage magnitude of batteries 24 and 27, will flow therein. Control electrode 21 will, therefore, assume a negative potential relative to that of cathode 22 determined by the voltage magnitude of battery 24 minus the IR drop in resistors 25 and 26. Resistor 25 is adjusted to maintain the potential of control electrode 21 below the firing point of thyratron 18, as stated above. Since the direct current resistance of thermoplastic 16 is by far the largest resistance in this circuit, a sudden drop in the direct current resistance of thermoplastic 16, such as that which has been found to immediately precede arcing, causes a large increase in the current through the circuit. This increases the IR drop through resistors 25 and 26 proportionately, causing the potential on control electrode 21 to rise above the firing point, thus causing thyratron 18 to conduct. When thyratron 18 conducts, it acts as the closing of a switch effectively connecting the positive terminal of arc suppressor power supply 17 to ground. Since the negative terminal of oscillator power supply 11 is also connected to ground, the output of the two power supplies are effectively placed in series with each other. Since the grid of oscillator 12 is connected to the negative terminal of arc suppresser power supply 17, it will be seen that the grid of oscillator 12 will, upon the firing of thyratron 18, assume a high negative potential. This high negative potential is sufficient to cut off oscillator 12. It is well known that once a thyratron is fired the control electrode thereof loses control until the anode potential thereof falls below the ionization potential. Therefore thyratron 18, once fired, will conduct until the end of the timing period.

Choke 32 and filter 28 are inserted to prevent any radio frequency potential on electrode 14 from reaching control electrode 21. Filter 28, however, has a time constant sufficiently short to allow the potential on control electrode 21 to follow any drop in the direct current resistance of the thermoplastic 16, so that thyratron 18 always fires before any arc can be formed.

It will be seen that the higher the voltage magnitudes of batteries 24 and 27 are, the more sensitive will be the operation of the arc suppresser circuit. However, increasing these voltage magnitudes, increases the direct current potential difference existing between electrodes 14 and 15. This potential difference itself, if too high, tends to produce arcing. Therefore the voltage magnitudes of batteries 24 and 27 are selected as a compromise between these two factors.

Although only a preferred embodiment of my invention has been disclosed herein, it is to be understood that my invention is only to be limited by the scope of the claims appended hereto.

I claim:

1. In combination: a capacitance including first and second electrodes and a dielectric having a normal first given value of direct current resistance interposed between said first and second electrodes; first means including an oscillator having its output coupled to the electrodes of said capacitance for normally supplying a radio-frequency voltage to said capacitance, whereby an arc will be initiated between said first and second electrodes should the direct current resistance of said dielectric fall to a second given value; a source of direct current voltage; and second means including normally open switching means coupled between said source of direct current voltage and said oscillator for applying said direct current voltage to said oscillator to effect the cut-off thereof in response to the closing of said switching means; and means responsive to direct current resistance coupled between the electrodes of said capacitance and said switching means for closing said switching means in response to the direct current resistance of the dielectric of said capacitance falling below a third given value which is intermediate said first and second given values, said second means having a switching response time which is short relative to the time which it takes for the direct current resistance of the dielectric of said capacitance to fall from said third value to said second value.

2. The combination in accordance with claim 1, wherein said switching means comprises a thyratron having at least a cathode, anode and control electrode, and biasing means coupled between the cathode and control electrode of said thyratron for rendering said thyratron normally cut off; and wherein said means for closing said switching means includes means connected between said capacitance and the control electrode of said thyratron for raising the potential on said control electrode to the firing point in response to the direct current resistance of said dielectric falling below said third given value.

3. The combination in accordance with claim 2, wherein said biasing means includes a source of biasing potential and a resistance connected in series between said control electrode and cathode; and wherein said means for raising the potential on said control electrode to the firing point includes means connecting said capacitance between said cathode and control electrode.

4. The combination in accordance with claim 3, wherein said means connecting said capacitance between said cathode and control electrode includes a second source of potential serially connected in adding relationship to said source of biasing potential.

5. The combination in accordance with claim 4, wherein said means connecting said capacitance between said cathode and control electrode further includes a resistance-capacitance filter and a choke for preventing said radio-frequency voltage from reaching said control electrode.

References Cited in the file of this patent

UNITED STATES PATENTS

| | | |
|---|---|---|
| 2,064,192 | Brown | Dec. 15, 1936 |
| 2,165,848 | Gothe et al. | July 11, 1939 |
| 2,454,618 | Stone | Nov. 23, 1948 |
| 2,548,246 | Walstrom | Apr. 10, 1951 |
| 2,638,529 | Gard | May 12, 1953 |